US012746415B2

(12) United States Patent
Stekr et al.

(10) Patent No.: US 12,746,415 B2
(45) Date of Patent: Sep. 29, 2026

(54) CLIMB SAFETY DEVICE INCLUDING A BIASING ELEMENT COMPRESSIBLE BY A LOAD BEARING MEMBER

(71) Applicant: PERFECTVISION MANUFACTURING, INC., Little Rock, AR (US)

(72) Inventors: Scott Stekr, Littleton, CO (US); Brenton Barton, Golden, CO (US); Dominic Newnham, Centennial, CO (US)

(73) Assignee: PERFECTVISION Manufacturing, Inc., Little Rock, AR (US)

( * ) Notice: Subject to any disclaimer, the term of this patent is extended or adjusted under 35 U.S.C. 154(b) by 662 days.

(21) Appl. No.: 18/092,236

(22) Filed: Dec. 31, 2022

(65) Prior Publication Data

US 2024/0216719 A1 Jul. 4, 2024

(51) Int. Cl.
*A62B 1/18* (2006.01)

(52) U.S. Cl.
CPC .................................... *A62B 1/18* (2013.01)

(58) Field of Classification Search
CPC ......... A62B 1/14; A62B 1/18; A62B 35/0068; A62B 35/04
USPC .............................................................. 182/5
See application file for complete search history.

(56) References Cited

U.S. PATENT DOCUMENTS

| | | | | | |
|---|---|---|---|---|---|
| 3,179,994 | A * | 4/1965 | Meyer | A62B 1/14 | 188/65.2 |
| 3,492,702 | A * | 2/1970 | Stafford | F16G 11/101 | 403/374.5 |
| 3,811,155 | A * | 5/1974 | Stafford | F16G 11/101 | 403/374.5 |
| 4,059,871 | A * | 11/1977 | Swager | E06C 7/186 | 182/8 |
| 4,077,094 | A * | 3/1978 | Swager | A62B 1/14 | 182/5 |
| 4,085,818 | A * | 4/1978 | Swager | E06C 7/187 | 182/8 |
| 4,140,207 | A * | 2/1979 | Sharp | A62B 35/04 | 24/134 P |
| 4,193,475 | A * | 3/1980 | Sweet | E06C 7/187 | 182/8 |
| 5,238,084 | A * | 8/1993 | Swager | E06C 7/187 | 182/8 |
| 5,924,522 | A * | 7/1999 | Ostrobrod | A62B 1/14 | 182/5 |
| 6,161,647 | A * | 12/2000 | Braden | A62B 35/0062 | 182/8 |
| 2004/0163898 | A1* | 8/2004 | Bergquist | A62B 1/14 | 188/65.2 |
| 2005/0029045 | A1* | 2/2005 | Cowin | A63B 29/02 | 182/92 |
| 2017/0260762 | A1* | 9/2017 | Ostrobrod | E04G 21/3204 | |
| 2019/0201724 | A1* | 7/2019 | Turcotte | A62B 35/005 | |

* cited by examiner

*Primary Examiner* — Brady W Frazier
(74) *Attorney, Agent, or Firm* — Paul Chancellor; Ocean Law

(57) ABSTRACT

A climb safety device where movement of a load bearing member relative to an attachment member is resisted by a biasing element.

5 Claims, 9 Drawing Sheets

CLIMB SAFETY DEVICE INCLUDING A BIASING ELEMENT COMPRESSIBLE BY A LOAD BEARING MEMBER

BACKGROUND OF THE INVENTION

Field of the Invention

The invention relates to the field of manufactured devices. More particularly, the present invention relates to a mechanical device for safeguarding an individual positioned on an elevated structure.

Discussion of the Related Art

Various climb safety devices are known for safeguarding persons against falls. Most of these safety devices utilize the belay technique where a running rope is fixed around a cleat or rock to support a climber at one end of the rope while a belayer holds the other end of the rope. Requiring only a belt, rope, and fix point, the belay technique is simple and remains the predominant method of safeguarding an individual.

SUMMARY OF THE INVENTION

A climb safety system and a climb safety device includes one or more of a biasing element, an attachment member, and a load bearing member.

In an embodiment, a climb safety system comprises: a climb safety device mounted to a tower above a lower unit mounted to the tower; a rope is stretched between the climb safety device and a lower unit, the rope for securing a climber to the tower; and, the climber imparting a vertical force to the rope and the climb safety device reacting to the force; wherein climb safety device incorporates a biasing element that is compressed along a line that is parallel to the direction of the force.

In an embodiment, a climb safety device comprises: a biasing element, load bearing member, and attachment member; the attachment member including left and right plates and the load bearing member therebetween; the load bearing member for compressing the biasing element between an upper end of the load bearing member and a bifurcated platform of the attachment member left and right plates; and, the biasing element compressed along a vertical axis when a load hangs from the load bearing member.

In an embodiment a climb safety device comprises: a biasing element, load bearing member, and attachment member; a guide pin fixed to the load bearing member and movable in a vertical slot in the attachment member; the biasing element for bearing a load placed on the load bearing member; and, the guide pin and slot for limiting the compression of the guide member.

DETAILED DESCRIPTION OF THE PREFERRED EMBODIMENTS

The disclosure provided in the following pages describes examples of some embodiments of the invention. The designs, figures and description are non-limiting examples of the embodiments they disclose. For example, other embodiments of the disclosed device and/or method may or may not include the features described herein. Moreover, disclosed advantages and benefits may apply to only certain embodiments of the invention and should not be used to limit the disclosed invention.

As used herein, the term "coupled" includes direct and indirect connections. Moreover, where first and second devices are coupled, intervening devices including active devices may be located therebetween. As used herein, "bolt" or similar references to fasteners include similar methods of fastening that are suitable for the application disclosed such as welds, rivets, elongated members, pins, and the like.

Figure 1A:
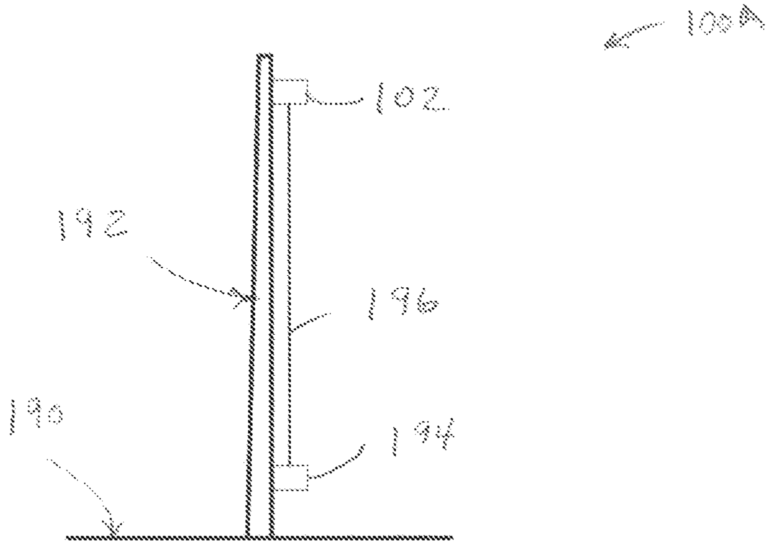
FIG. 1A shows a block diagram illustrating an installed climb safety device in accordance with the present invention.

FIG. 1A is a schematic diagram of an installed climb safety device 100A. While the safety device 102 may be used in a variety of applications/configurations, the referenced figure shows the safety device installed on a tower 192 supported from the ground 190. Here, the climb safety device 102 is mounted to the tower above a lower 194 unit and a line or safety line 196 is stretched therebetween. In an example of its use in this application/configuration, a person positioned on the tower between the safety device 102 and the lower unit may utilize the line stretched therebetween as a safety line. Notably, the line may be 1) a metallic cable, 2) any rope or cord incorporating natural material(s) such as cotton, hemp, or the like, or 3) any rope or cord made incorporating a synthetic material(s) such as nylon, Kevlar®, polyester, or the like. Any such line may be referred to herein as a rope.

Figure 1B:
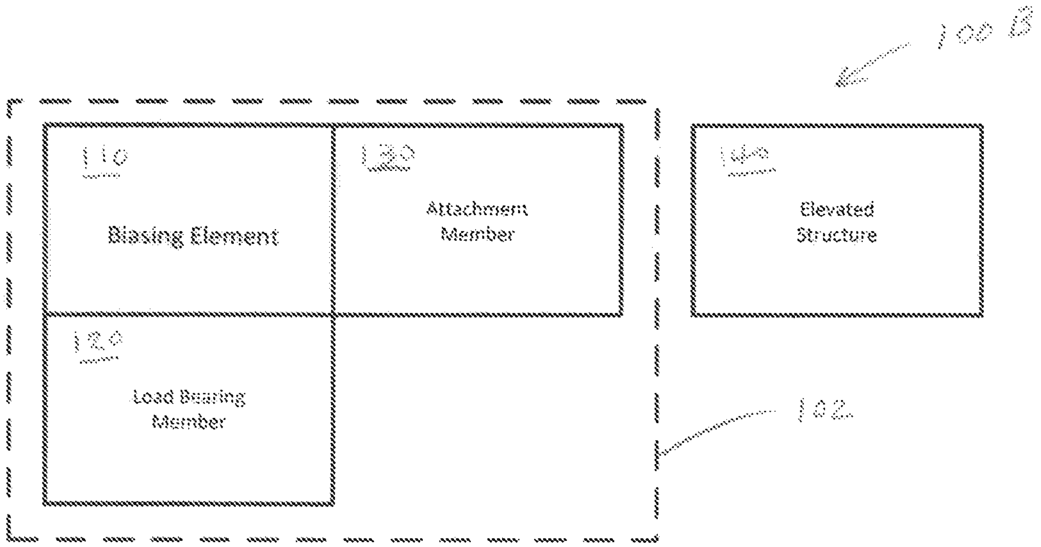
FIG. 1B shows a block diagram of the climb safety device of FIG. 1A.

FIG. 1B is a block diagram 100B illustrating an embodiment of the climb safety device disclosed herein. The safety device 102 is for connection to an elevated structure 140 via an attachment member 130 such that all or part of a load acting on the safety device is transferred to the elevated structure. The safety device includes the attachment member 130, a biasing element 110, and a load bearing member 120. The biasing element may be any one of or any combination of a spring, coil spring, leaf spring, hydraulic damper, hydraulic cylinder, damper, elastomeric damper, rubber damper, or the like. In an embodiment, the biasing element bears some or all of a load acting on the load bearing member. The biasing element may be compressed when bearing a load such as a load acting on the load bearing member.

Figure 2A:
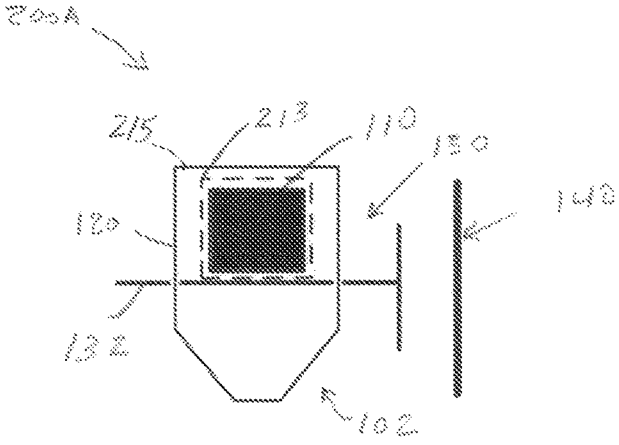
FIGS. 2A-C show schematic and force diagrams of the climb safety device of FIG. 1A.
Figure 2B:
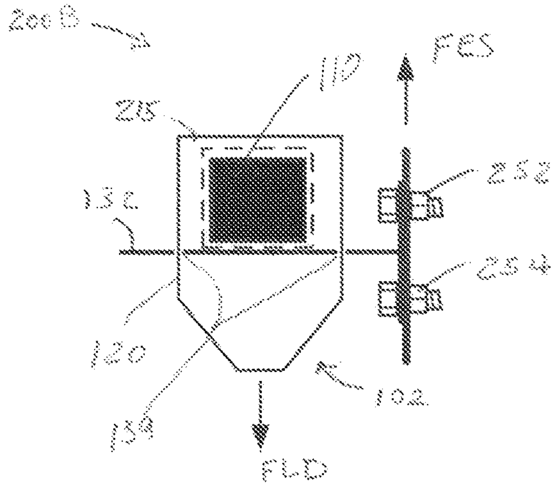
Figure 2C:
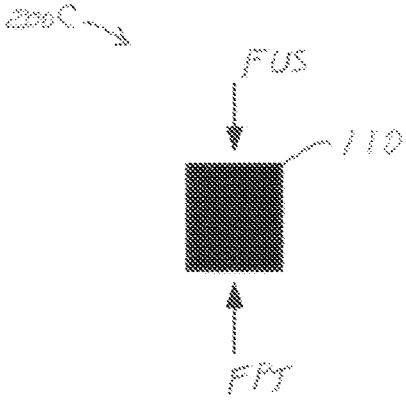

FIGS. 2A-C show schematic diagrams 200A-C of a climb safety device embodiment that is similar to safety device of FIG. 1B. FIG. 2A shows a safety device 102 supported by or attached to an elevated structure 140. The safety device includes a biasing element 110 located in an opening 213 of a hoop-like structure that is a load bearing member 120. The load bearing member may pass through one or more openings in a floor or platform 132 of the attachment member 130.

FIG. 2B shows the safety device attached to the elevated structure 200B. In the figure, the damping member is shown between an upper segment 215 of the load bearing member 120 and the attachment member 130 platform 132. Because the load bearing member passes through a platform opening, the biasing element is compressed between the upper segment and the platform when a load FLD tends to pull the upper segment toward the platform. Compression of the biasing element results from what may be equal and opposite forces placed on the biasing element by the upper segment and the platform of the attachment member. Notably, the attachment member is supported by the elevated structure via its bolted 252, 254 connection such that a force FES which may be equal and opposite to load FLD is born by the elevated structure. In some embodiments, the line along which the force FLD acts is the same line or a parallel line along which the biasing element 110 is compressed.

FIG. 2C shows a free body diagram 200C of the biasing element 110. Here, load FLD results in force FUS imparted by the upper segment 215 on the biasing element. A force FPT which may be equal and opposite to force FUS is imparted by the platform 132 on the biasing element.

Figure 3A:
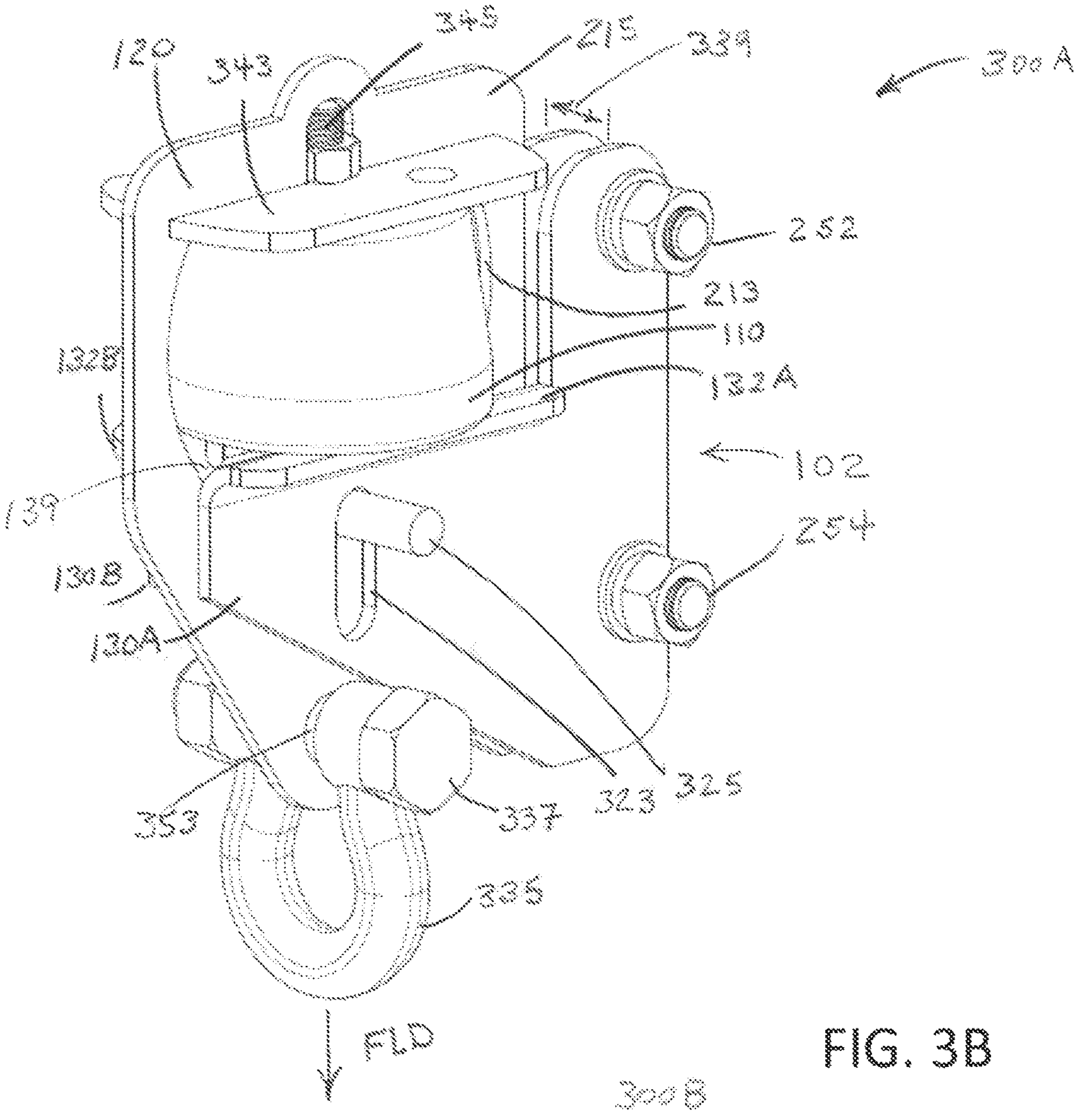
FIG. 3A shows a perspective view of an embodiment of a climb safety device of FIG. 1A.

FIGS. 3A-D show a climb safety device with embodiments 300A-D that are similar to the safety device of FIG. 1B. FIG. 3A shows a safety device 102. The safety device includes a biasing element 110 located in an opening 213 of a hoop-like structure that is a load bearing member 120. The load bearing member may pass through one or more openings in a floor or platform 132A-B of the attachment member 130A-B.

Regarding the platform, note that the platform includes, a flange 132A of attachment member 130A that points away from the through bolt 345. Note that the platform includes a flange 132B of the attachment member 130B that points away from through bolt 345. With this platform configuration, the spacing 339 of the attachment members 130A and 130B need not accommodate the projection of the flanges as when the flanges point to each other.

Figure 3B:
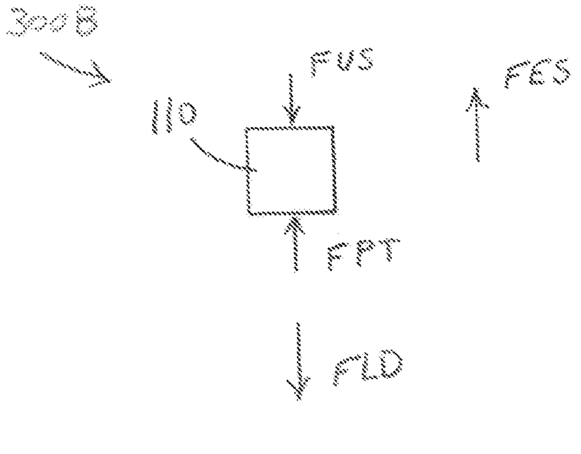
FIG. 3B shows forces on the climb safety device of FIG. 3A.

Referring to FIGS. 3A-B, the damping member is shown between an upper segment 215 of the load bearing member 120 and the attachment member 130A-B platform 132A-B. Because the load bearing member passes through a platform opening, the biasing element is compressed between the upper segment and the platform when a load FLD tends to pull the upper segment toward the platform. Compression of the biasing element results from what may be equal and opposite forces placed on the biasing element by the upper segment and the platform of the attachment member. Notably, the attachment member is supported by an elevated structure (not shown) which may utilize bolted connection(s) (eg. 252, 254) such that a force FES which may be equal and opposite to load FLD is born by the elevated structure.

FIG. 3B shows a free body diagram 300B including biasing element 110. Here, load FLD results in force FUS imparted by the upper segment 215 on the biasing element. A force FPT which may be equal and opposite to force FUS is imparted by the platform 132 on the biasing element.

Figure 3C:
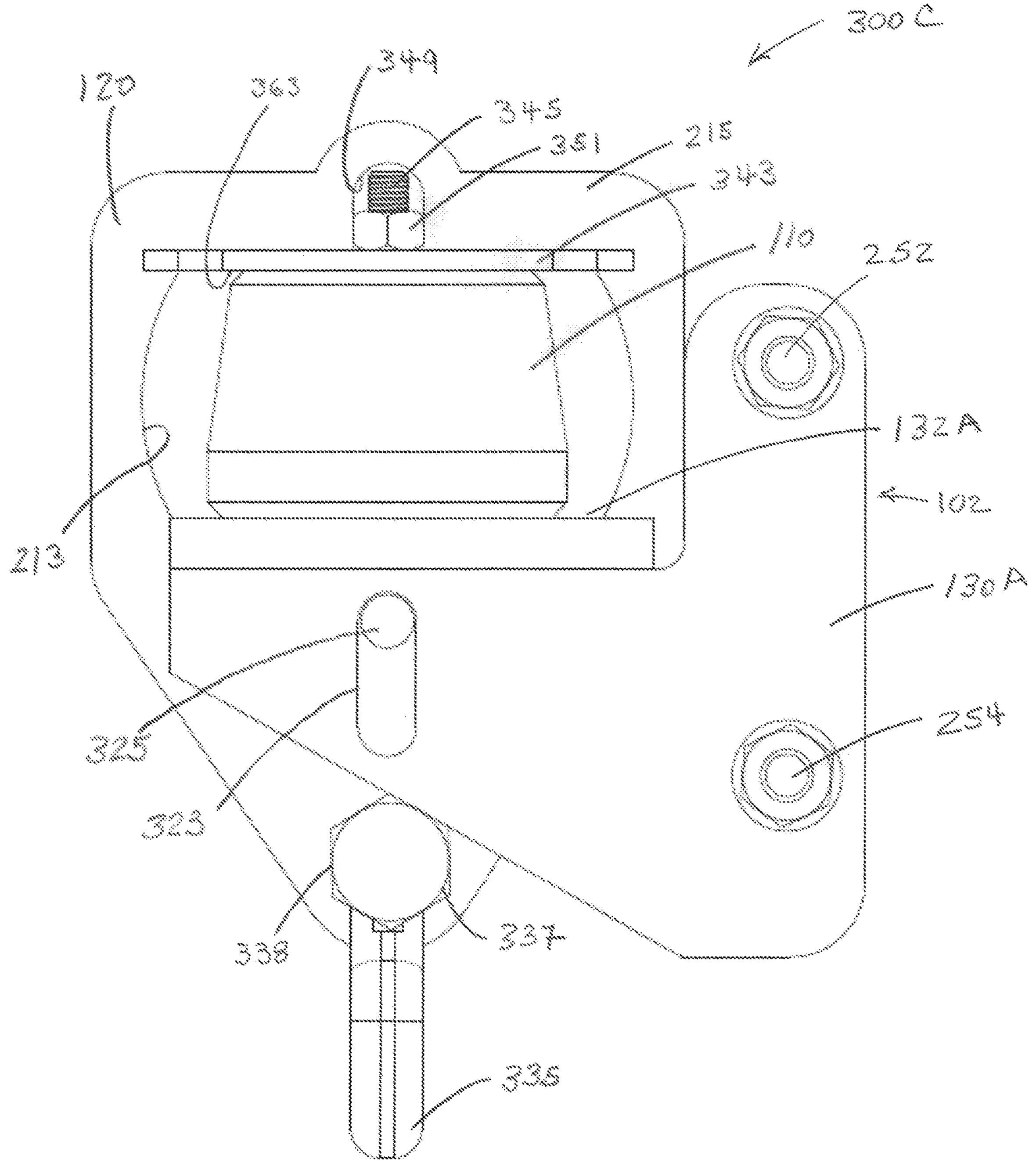
FIG. 3C shows a side view of the climb safety device of FIG. 3A.

FIG. 3C shows a side view of the safety device 300C exposing attachment member 130A. As seen, additional members which may be optional include a guide pin 325, a shackle 335, a back plate 343, and a thru bolt 345.

The guide pin 325 passes through and may be fixed to the load bearing member 120. The guide pin protrudes into a slot 323 of attachment member 130A and may also protrude into a similar slot in attachment member 130B (not shown). The guide pin may function to limit the compression of the biasing element 110. The guide pin may function to maintain a parallel or substantially parallel relationship between the back plate 343 or upper segment 215 lower surface 363 and the platform 132A-B. The guide pin may function to prevent or limit rotation of the load bearing member 120 with respect to the attachment member. Note that the cross-section of the guide pin may be circular, square, multisided or otherwise configured with the slot to prevent guide pin rotation in the slot.

The shackle 335 or a similar means of connection may be fixed to the load bearing member via a shackle bolt 337 passing through a hole such as a hole 338 passing through a lower end of the load bearing member 120.

The biasing element 110 located between the upper segment 215 and platform 132A-B may be held in place by a through bolt 345 such as a through bolt passing through centrally through the biasing element. The through bolt may extend vertically in the opening 213 with a lower bolt end anchored to the load bearing member 120. An upper end of the bolt may pass through and be fixed to the back plate 343 which may be fixed to the load bearing member. The bolt upper end and its fixture (e.g. nut 351) and may be captured in a cutout 349 in the upper segment. In various embodiments, a height of the biasing element varies with FLD and slipping may occur at an interface between the through bolt and biasing element.

Figure 3D:
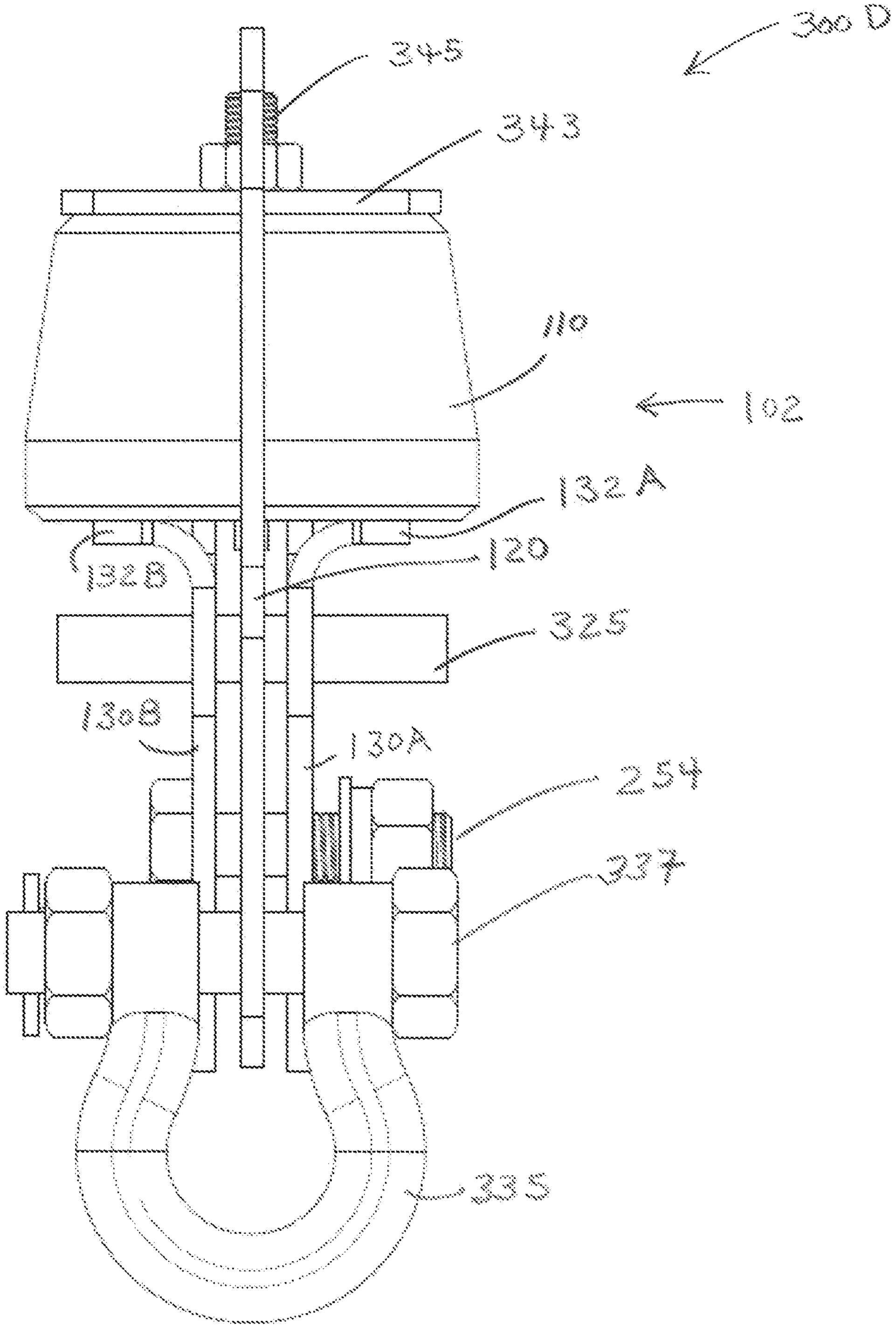
FIG. 3D shows an end view of the climb safety device of FIG. 3A.

FIG. 3D shows an end view of the safety device 300D exposing shackle 335. Here, side views include the shackle 335 bolted 337 to the load bearing member 120, attachment members 130A-B, platform members 132A-B and biasing element 110 atop the platform members, guide pin 325 passing through the attachment members and load bearing member, and through bolt 345 passing through the back plate 343 which is atop the biasing element.

Figure 3E:
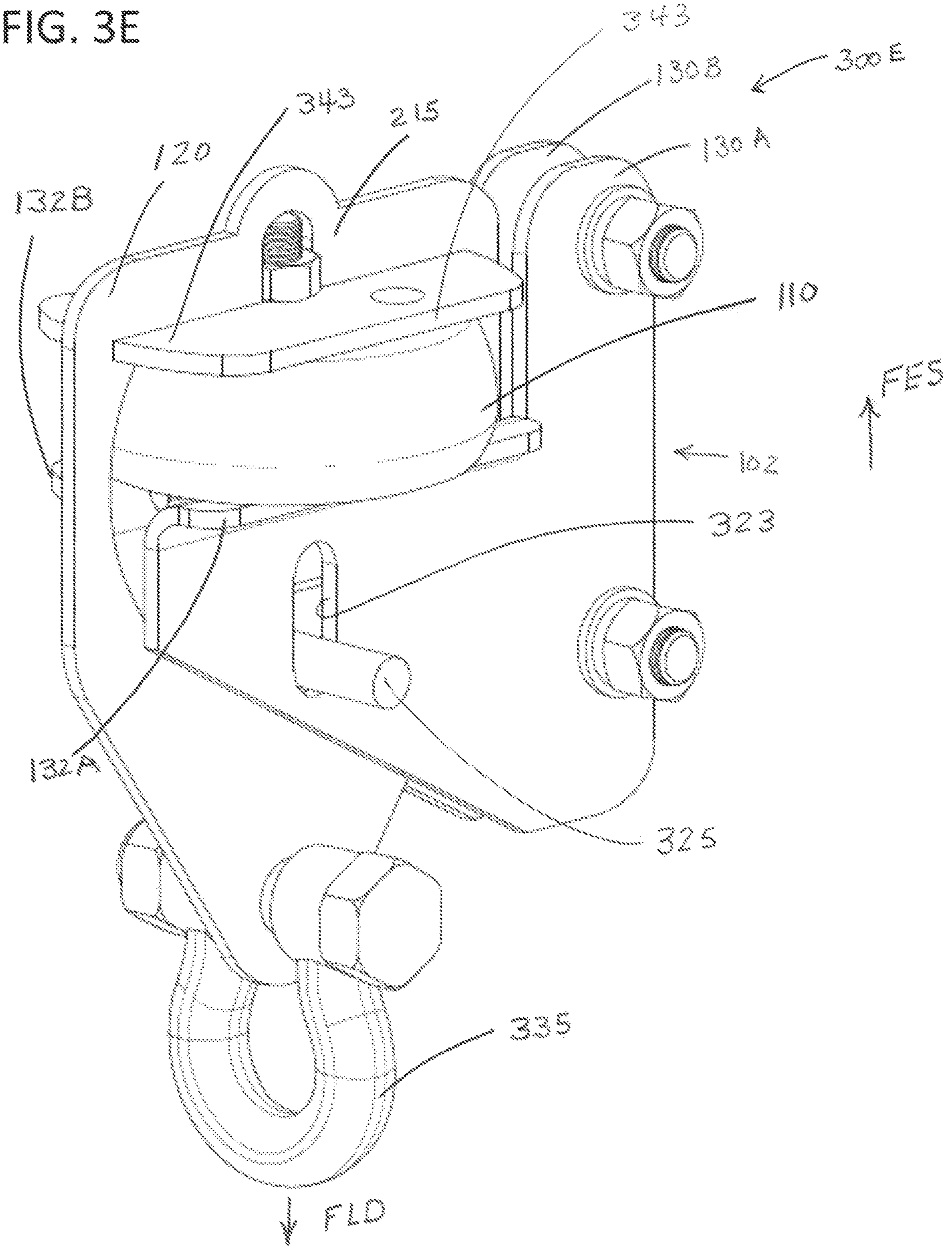
FIG. 3E shows the climb safety device of FIG. 3A with a compressed biasing element.

FIG. 3E shows the safety device under load 300E. Here, a load FLD acting on the shackle 335 is transferred to the load bearing member 120 and via the load bearing member to the back plate 343 which bears on the top of the biasing element 110. Opposing this load is the platform 132A-B of the attachment member 130A-B which transfers the load FES to an elevated structure (not shown). The biasing element transfers the load from the back plate and the platform and in so doing is compressed.

Figure 3F:
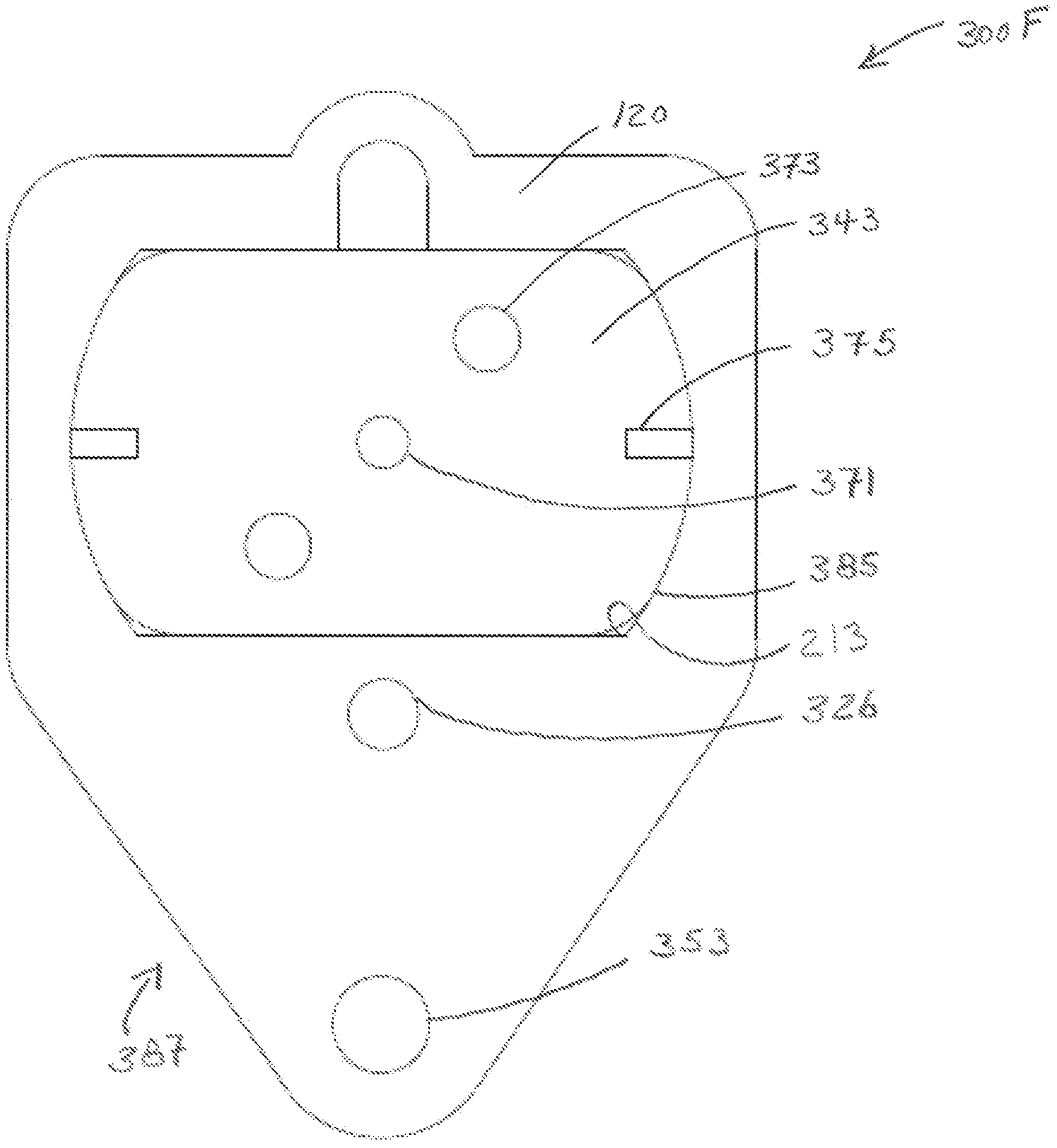
FIG. 3F shows a manufacturing step of components of the climb safety device of FIG. 3A.

FIG. 3F shows an embodiment of a precursor part including the load bearing member and back plate 300F. Here, the precursor part 387 includes a cutout or removable part wherein the back plate 343 is removed from what will become the load bearing member 120. For example, a cut or severance line 385 allows for removal of the back plate.

The back plate 343 may include five penetrations: two penetrations 373 through which the biasing element may protrude, two cutouts 375 at opposed edges of the back plate, and one penetration 371 for the through bolt 345. The back plate cutouts may provide for alignment of the biasing element. The load bearing member 120 may include penetrations 1) a penetration for the shackle bolt 353 and 2) a penetration for the guide pin 326. Removal of the back plate from the precursor part 387 results in a opening 213 therein which will receive the biasing element 110.

Figure 4A:
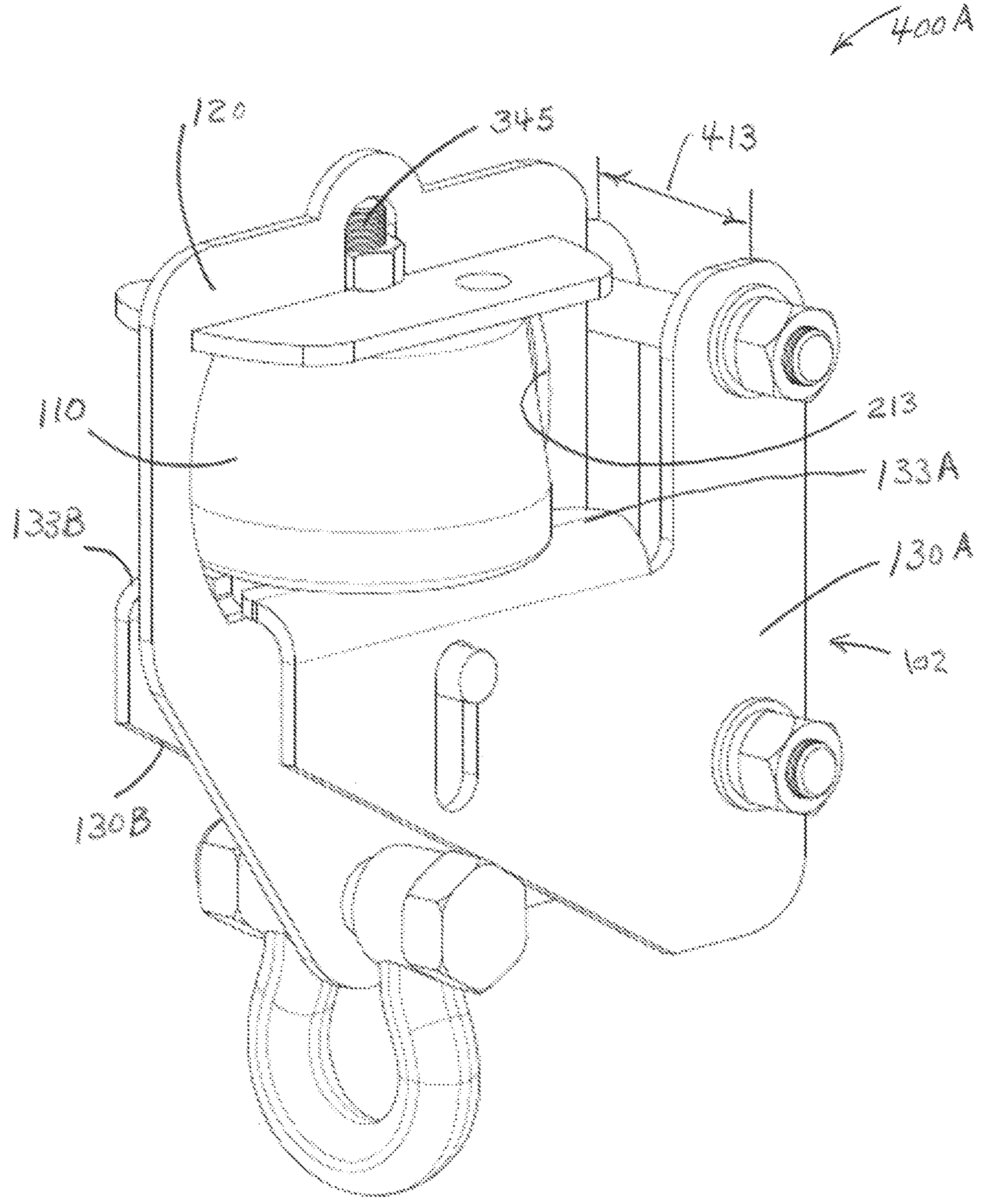
FIG. 4A shows a perspective view of another embodiment of a climb safety device of FIG. 1A.
Figure 4B:
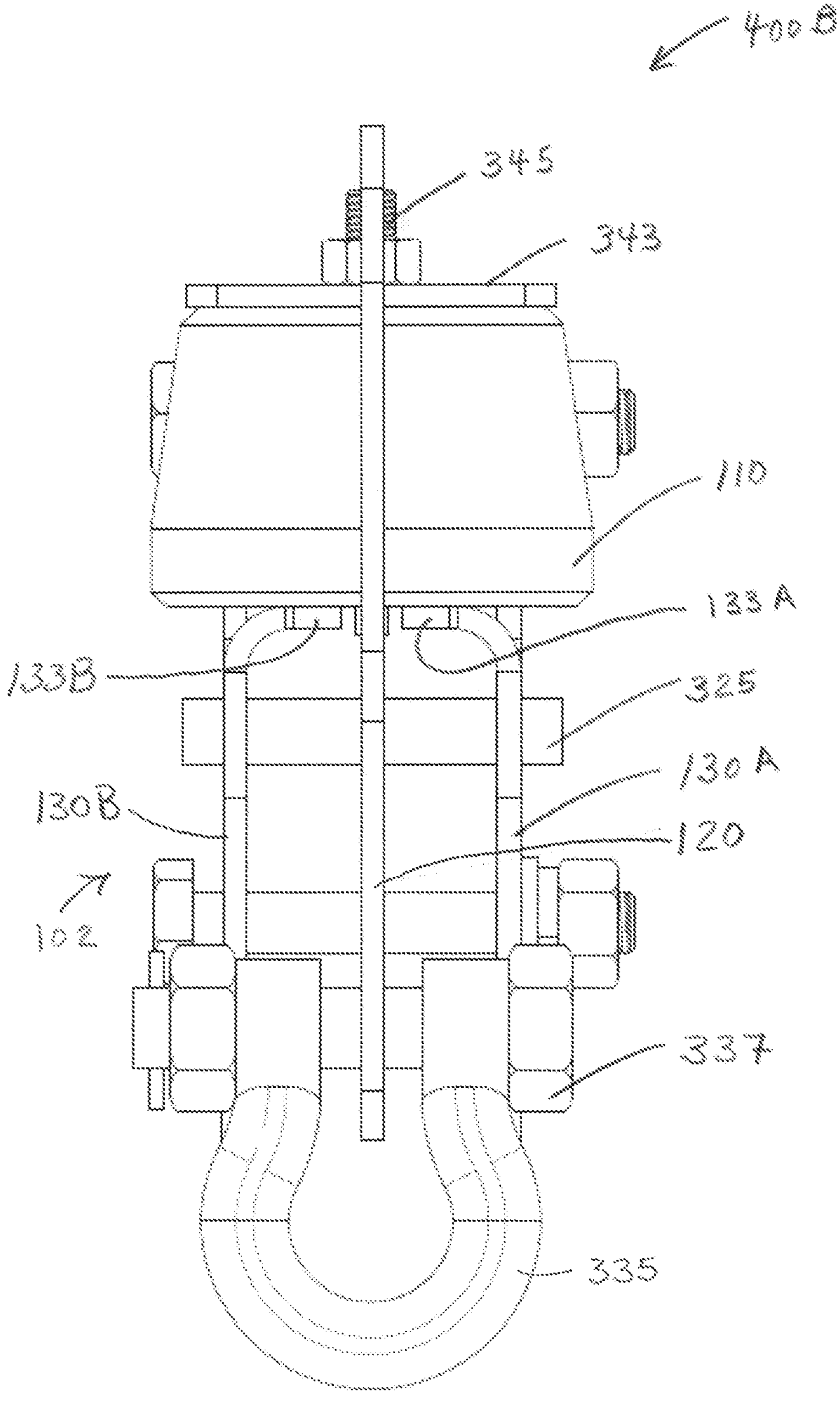
FIG. 4B shows an end view of the climb safety device of FIG. 4A.

FIGS. 4A-B show a climb safety device with embodiments 400A-B that are similar to the safety device of FIG. 1B. FIG. 4A shows a safety device 102. The safety device includes a biasing element 110 located in an opening 213 of a hoop-like structure that is a load bearing member 120. The load bearing member may pass through one or more openings in a floor or platform 133A-B of the attachment member 130A-B.

Regarding the platform, note that the platform includes, a flange 133A of attachment member 130A that points toward the through bolt 345. Note that the platform includes a flange 133B of the attachment member 130B that points toward the through bolt 345. With this platform configuration, the spacing 413 of the attachment members 130A and 130B accommodates the projection of the flanges which face end to end.

FIG. 4B shows an end view of the safety device 400B exposing shackle 335. Here, side views include the shackle 335 bolted 337 to the load bearing member 120, attachment members 130A-B, platform members 133A-B and biasing element 110 atop the platform members, guide pin 325 passing through the attachment members and load bearing member, and through bolt 345 passing through the back plate 343 which is atop the biasing element.

While various embodiments of the present invention have been described above, it should be understood that they have been presented by way of example only, and not limitation. It will be apparent to skilled artisans that various changes in form and details can be made without departing from the spirit and scope of the invention. As such, the breadth and scope of the present invention should not be limited by the above-described examples, but should be defined only in accordance with the following claims and equivalents thereof.

What is claimed is:

1. A climb safety device comprising:

a biasing element, load bearing member, and attachment member;

the attachment member including left and right plates and the load bearing member therebetween;

the load bearing member configured to compress the biasing element between an upper end of the load bearing member and a bifurcated platform of the attachment member left and right plates;

the biasing element including a vertical axis; and, the biasing element compressed along the vertical axis when a load hangs from the load bearing member.

2. The climb safety device of claim 1 further comprising:

a back plate between the load bearing member and the biasing element; and, a through bolt passing through the biasing element and the back plate.

3. The climb safety device of claim 1 further comprising:

the load bearing member including a guide pin; and, the guide pin passing through a slot in the attachment member.

4. The climb safety device of claim 1 further comprising:

an opening in the load bearing member; and, the hole encircling the biasing element.

5. A climb safety device comprising:

a biasing element, load bearing member, attachment member, and elevated structure;

the attachment member affixed to the elevated structure;

a guide pin fixed to the load bearing member and movable in a vertical slot in the attachment member;

the biasing element for bearing a load placed on the load bearing member;

the guide pin and slot for limiting compression of the biasing element;

the attachment member having left and right sides;

at least two bolts one of the bolts situated vertically over the other bolt;

the bolts passing through the attachment member left and right sides; and, the bolts for attaching the attachment member directly or indirectly to structure to be climbed.

* * * * *